(12) United States Patent
Rosenpflanzer et al.

(10) Patent No.: US 7,797,626 B2
(45) Date of Patent: Sep. 14, 2010

(54) MANAGING DIFFERENT REPRESENTATIONS OF INFORMATION

(75) Inventors: Lutz Rosenpflanzer, Montreal (CA); Richard Leblanc, Vaudreuil (CA); Ralf Steuernagel, Bruchsal (DE)

(73) Assignee: SAP AG, Walldorf (DE)

( * ) Notice: Subject to any disclaimer, the term of this patent is extended or adjusted under 35 U.S.C. 154(b) by 1421 days.

(21) Appl. No.: 10/607,102

(22) Filed: Jun. 25, 2003

(65) Prior Publication Data
US 2004/0268247 A1 Dec. 30, 2004

Related U.S. Application Data

(60) Provisional application No. 60/447,230, filed on Feb. 13, 2003, now abandoned.

(51) Int. Cl.
*G06F 17/00* (2006.01)
(52) U.S. Cl. ........................ 715/249; 715/248; 715/234; 715/209
(58) Field of Classification Search ................. 715/523, 715/522, 513, 514, 515
See application file for complete search history.

(56) References Cited

U.S. PATENT DOCUMENTS

| | | | | |
|---|---|---|---|---|
| 5,119,465 A | * | 6/1992 | Jack et al. ..................... 717/137 |
| 5,173,853 A | * | 12/1992 | Kelly et al. ................... 715/530 |
| 5,272,628 A | * | 12/1993 | Koss ............................ 715/503 |
| 5,276,793 A | * | 1/1994 | Borgendale et al. ......... 715/513 |
| 5,367,619 A | * | 11/1994 | Dipaolo et al. .............. 715/506 |
| 5,369,761 A | * | 11/1994 | Conley et al. .................. 707/2 |
| 5,428,776 A | * | 6/1995 | Rothfield ........................ 707/4 |
| 5,442,778 A | * | 8/1995 | Pedersen et al. ................ 707/5 |
| 5,548,508 A | * | 8/1996 | Nagami .......................... 704/2 |
| 5,584,024 A | * | 12/1996 | Shwartz .......................... 707/4 |
| 5,587,902 A | * | 12/1996 | Kugimiya ....................... 704/2 |
| 5,627,979 A | * | 5/1997 | Chang et al. ................. 715/763 |
| 5,657,440 A | * | 8/1997 | Micka et al. .................. 714/16 |

(Continued)

FOREIGN PATENT DOCUMENTS

EP 1333374 A1 * 8/2003

(Continued)

OTHER PUBLICATIONS

Nick Dallett; 'Dhtml Localization on the Windows Update Site Microsoft.com; Oct. 1999, pp. 1 - 12 XP002164905 extract of the Internet; <http://www.microsoft.com/mind/1099/localize/localize.htm>.*

(Continued)

*Primary Examiner*—Doug Hutton
*Assistant Examiner*—Nathan Hillery
(74) *Attorney, Agent, or Firm*—Schwegman, Lundberg & Woessner, P.A.

(57) ABSTRACT

Systems and techniques, including computer program products, for managing different representations of information. The systems and techniques can include a method that includes receiving information identifying a first customization setting, receiving information identifying a second customization setting, and mapping the customized format of the data variable in the first data processing system to the customized format of the data variable in the second data processing system. The first customization setting can describe a customized representation of information in a data variable in a first data processing system. The second customization setting can describe a customized format of the data variable in the second data processing system.

30 Claims, 5 Drawing Sheets

U.S. PATENT DOCUMENTS

| | | | | | |
|---|---|---|---|---|---|
| 5,724,573 | A | * | 3/1998 | Agrawal et al. | 707/6 |
| 5,752,021 | A | * | 5/1998 | Nakatsuyama et al. | 707/5 |
| 5,778,356 | A | * | 7/1998 | Heiny | 707/2 |
| 5,802,529 | A | * | 9/1998 | Nakatsuyama et al. | 715/513 |
| 5,911,776 | A | * | 6/1999 | Guck | 709/217 |
| 5,915,259 | A | * | 6/1999 | Murata | 715/513 |
| 5,920,879 | A | * | 7/1999 | Kyojima et al. | 715/517 |
| 5,946,688 | A | * | 8/1999 | Roberts | 707/10 |
| 5,960,435 | A | * | 9/1999 | Rathmann et al. | 707/101 |
| 5,974,443 | A | * | 10/1999 | Jeske | 709/202 |
| 6,009,429 | A | * | 12/1999 | Greer et al. | 707/10 |
| 6,014,680 | A | * | 1/2000 | Sato et al. | 715/513 |
| 6,067,552 | A | * | 5/2000 | Yu | 715/501.1 |
| 6,083,276 | A | * | 7/2000 | Davidson et al. | 717/107 |
| 6,085,196 | A | * | 7/2000 | Motoyama et al. | 707/102 |
| 6,128,627 | A | * | 10/2000 | Mattis et al. | 707/202 |
| 6,199,198 | B1 | * | 3/2001 | Graham | 717/105 |
| 6,202,072 | B1 | * | 3/2001 | Kuwahara | 715/513 |
| 6,209,003 | B1 | * | 3/2001 | Mattis et al. | 707/206 |
| 6,282,544 | B1 | * | 8/2001 | Tse et al. | 707/101 |
| 6,311,173 | B1 | * | 10/2001 | Levin et al. | 706/21 |
| 6,311,180 | B1 | * | 10/2001 | Fogarty | 707/4 |
| 6,327,594 | B1 | * | 12/2001 | Van Huben et al. | 707/200 |
| 6,339,767 | B1 | * | 1/2002 | Rivette et al. | 707/2 |
| 6,377,956 | B1 | * | 4/2002 | Hsu et al. | 707/104.1 |
| 6,434,568 | B1 | * | 8/2002 | Bowman-Amuah | 707/103 R |
| 6,453,319 | B1 | * | 9/2002 | Mattis et al. | 707/100 |
| 6,480,865 | B1 | * | 11/2002 | Lee et al. | 715/523 |
| 6,484,177 | B1 | * | 11/2002 | Van Huben et al. | 707/10 |
| 6,487,566 | B1 | * | 11/2002 | Sundaresan | 715/513 |
| 6,499,041 | B1 | * | 12/2002 | Breslau et al. | 715/505 |
| 6,529,909 | B1 | * | 3/2003 | Bowman-Amuah | 707/10 |
| 6,535,896 | B2 | * | 3/2003 | Britton et al. | 715/523 |
| 6,546,381 | B1 | * | 4/2003 | Subramanian et al. | 707/2 |
| 6,564,203 | B1 | * | 5/2003 | Krishnaprasad et al. | 707/2 |
| 6,569,207 | B1 | * | 5/2003 | Sundaresan | 715/513 |
| 6,735,593 | B1 | * | 5/2004 | Williams | 707/102 |
| 2002/0010714 | A1 | * | 1/2002 | Hetherington | 707/505 |
| 2002/0103881 | A1 | * | 8/2002 | Granade et al. | 709/218 |
| 2002/0123878 | A1 | * | 9/2002 | Menke | 704/2 |
| 2003/0046316 | A1 | * | 3/2003 | Gergic et al. | 707/513 |
| 2003/0078934 | A1 | * | 4/2003 | Cappellucci et al. | 707/101 |
| 2004/0015408 | A1 | * | 1/2004 | Rauen et al. | 705/26 |
| 2004/0046789 | A1 | * | 3/2004 | Inanoria | 345/748 |

FOREIGN PATENT DOCUMENTS

WO    WO 02/101549 A2 * 12/2002

OTHER PUBLICATIONS

Graham et al.; "An Experiment in Table Driven Code Generation"; Proceedings of the 1982 Sigplan Symposium on Compiler Construction, Boston, MA; pp. 32-43; Jun. 1982.

Reeuwijk; "Tm: a Code Generator for Recursive Data Structures"; Software-Practice and Experience; vol. 22:10; pp. 899-908, Oct. 1992.

Document entitled "XSL Transformations (XSLT) Version 1.0"; copyright WSC, 1999, 11 pages; *available at* URL:http://www.w3.org/TR/xslt.

Document entitled "XML Path Language (XPath) Version 1.0"; copyright WSC, 1999, 23 pages; *available at* URL:http://www.w3.org/TR/xpath.

Document entitled "BizTalk and Application Integration—Translating Between Message Specifications: BizTalk Mapper"; copyright Oleg Gdalevich, 1998-2000, 3 pages; *available at* URL:http://web.archive.org/web/20010414222316/http://www.vbip.com/books/1861003293/chapter_3293_13.asp.

Document entitled "XSLT Part 2—How does XSLIT transform XML?"; copyright Beginners.Co.UK, 1999; 3 pages, *available at* URL:http://web.archive.org/web/20011124080629/http://tutorials.beginners.co.uk/read/id/143.

Document entitled "Mapping Specifications"; copyright Microsoft Corporation, 1999-2000, 1 page; *available at* URL:http://web.archive.org/web/20021108050606/http://msdn.inicrosoft.com/library/en-us/biztalks/htm/1at_xmltools_map_concept_mvem.asp.

Document entitled "NetBryx XML Enterprise Studio White Paper"; copyright NetBryx LLC, 2002-03, 10 pages, *available* at URL:http://web.archive.org/web/20030203094453/http://editml.com/Netabryx_XML_Enterprise_Studio_WP.pdf.

Document entitled "PropelXbi Product Data Sheet," Propylon Ltd., 2 pages (2003).

Document entitled "PropelX—for Publishing and eLearning Companies," Propylon Ltd., 2 pages (2002).

Document entitled "ContentMaster Data Sheet," ItemField, 4 pages (undated).

Document entitled "New Era of Networks e-Biz Integrator," New Era of Networks, Inc., 2 pages (2002).

Document entitled "Ascential Inside Integrator," Ascential Software, 2 pages (2003).

Document entitled "TIBCO Business Works SmartMapper," TIBCO Software Inc., 4 pages (2003).

Document entitled "mapforce 2004," 5 pages, Altova, Inc., (2003).

Whitepaper entitled "Simplifying XML Data Integration with mapforce 2004," Larry Kim, Altova, Inc., 13 pages (2003).

Document entitled "Application Integrator," Global eXchange Services, Inc., 2 pages (2003).

Document entitled "Sonic ESB," Sonic Software Corporation, 2 pages (2001-2003).

Whitepaper entitled "Sonic ESB Product Backgrounder," Sonic Software Corporation, 14 pages (2002).

Document entitled "Integration Engines & Wrappers," Data Junction Corporation, 7 pages (2003).

Document entitled "Microsoft BizTalk Server, The EAI B2B and business process automation solution, Product Overview," Microsoft Corporation, 6 pages (2003).

Document entitled "WDI Map Builder," Brunswick Corporation, 1 page (2000-2003).

Document entitled "Enterprise Information Integration (EII) and the Corporate Information Factory," Intelligent Solutions, Inc., 16 pages (Feb. 2003).

S. Mohr and S. Woodgate, chapter 4, pages 153-205 of "Professional Biztalk," Wrox Press Ltd., Birmingham, U.K., copyright 2000.

* cited by examiner

200

| PRODUCTS ||||| 
|---|---|---|---|---|
| Name | Units | Size (cm) | Wt (kg) | Cost (Euro) |
| Prod. 915A | 0 | 7 | 5 | 12 |
| Prod. 915B | 0 | 12 | 9 | 18 |
| Prod. 915C | 1 | 13 | 7 | 18 |
| Prod. 918A | 3 | 9 | 3 | 14 |
| Prod. 918B | 0 | 6.5 | 3 | 11 |
| Prod. 921 | 8 | 6.5 | 3 | 11 |

| PRODUCTS ||||| 
|---|---|---|---|---|
| Name | Units | Size (in) | Wt (kg) | Cost ($) |
| Prod. 915A | 16 | 15.4 | 5 | 11.4 |
| Prod. 915B | 0 | 26.4 | 9 | 17.1 |
| Prod. 915C | 0 | 28.6 | 7 | 17.1 |
| Prod. 918A | 0 | 19.8 | 3 | 13.3 |
| Prod. 918B | 7 | 14.3 | 3 | 10.45 |
| Prod. 921 | 8 | 14.3 | 3 | 10.45 |

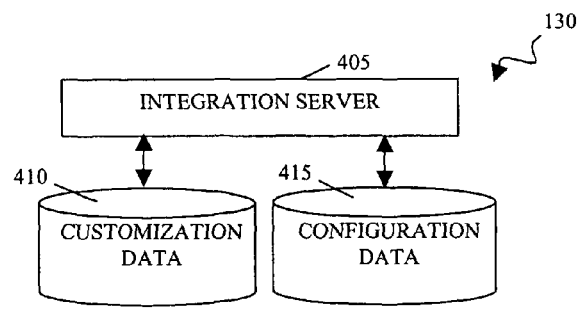
FIG. 4
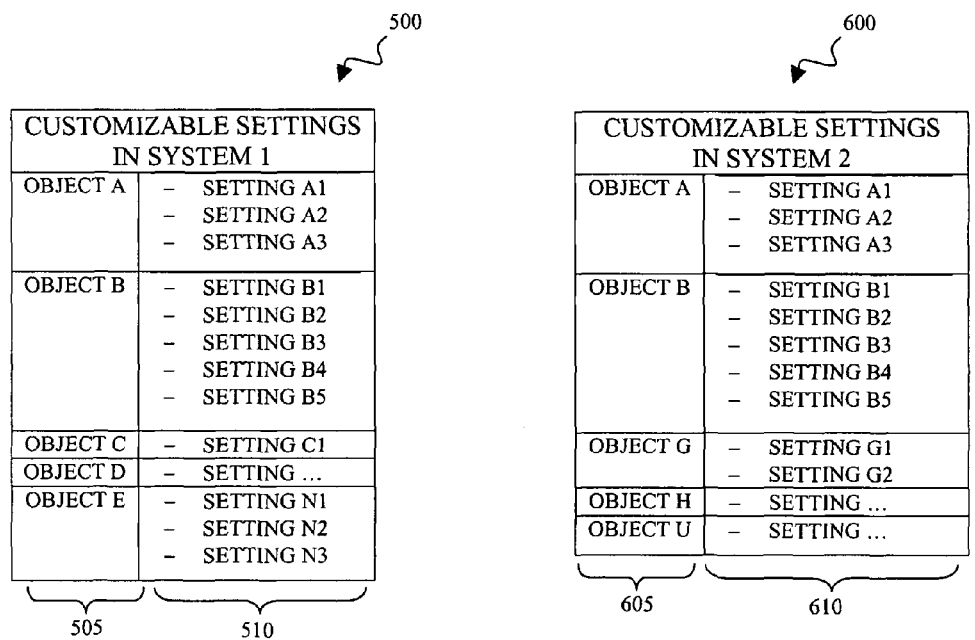
FIG. 5  FIG. 6

MANAGING DIFFERENT REPRESENTATIONS OF INFORMATION

CROSS-REFERENCE TO RELATED APPLICATIONS

This application claims the priority of provisional patent application Ser. No. 60/447,230, filed Feb. 12, 2003 now abandoned and entitled "Key Mapping Framework."

BACKGROUND

This disclosure relates to managing the different representations of information used by different data processing devices.

Information, such as instructions for performing tasks and descriptions of the characteristics of items and people, can be stored in machine-readable representations by data processing devices. Different data processing devices often represent the same or similar information differently. For example, different schemes for organizing, associating, storing, processing, or encoding information can be used by different data processing devices. Discrepancies in the way information is represented often hinder or prevent different data processing devices from collaborating effectively.

SUMMARY

The present disclosure describes systems and techniques, including computer program products, for managing different representations of information. In general, in one aspect, the invention features a method that includes receiving information identifying a first customization setting, receiving information identifying a second customization setting, and mapping the customized format of the data variable in the first data processing system to the customized format of the data variable in the second data processing system. The first customization setting can describe a customized representation of information in a data variable in a first data processing system. The second customization setting can describe a customized format of the data variable in the second data processing system.

The invention can be implemented to include one or more of the following advantageous features. Machine-readable instructions for changing the customized format of the data variable in the first data processing system to the customized format of the data variable in the second data processing system can be established, e.g., by establishing a criterion for identifying the data variable in a first data structure or by establishing an extensible stylesheet language (XSL) file that describes how to change the customized format of the data variable. Machine-readable instructions can also be established by receiving a framework for instructions and inserting instructions into the framework.

Establishing machine-readable instructions can include selecting a germane instruction for transforming the customization of data from a collection of instructions for transforming the customization of data and/or establishing instructions for identifying the data variable in a data structure. The instructions for identifying the data variable can be an Xpath expression for identifying an object of an object class that includes the data variable.

The customized format of the data variable in the first data processing system can be changed to the customized format of the data variable in the second data processing system. A trigger for the mapping of the data variable can be received from a user. The trigger can identify a data object class that includes the data variable. The results of the mapping in a collection of mapping results for other data variables can be stored. The received information identifying the first customization setting can be instructions for locating the first customization setting in the first data processing system or the information can be the first customization setting itself. Instructions for data interfacing with the first data processing system can be received and added to the results of the mapping.

In general, in another aspect, the invention features a computer program product for managing different representations of information. The computer program product can be operable to cause a data processing apparatus to receive a data variable in a data structure, receive a description of a second representation of the information in the data variable, and change the data variable from the first representation to the second representation separately from any change to the data structure. The information in the received data variable can have a first representation associated with a first system. The second representation can be associated with a second system. The computer program product can be tangibly embodied in an information carrier.

The invention can be implemented to include one or more of the following advantageous features. The product can also be operable to cause the data processing apparatus to receive the data variable formatted in accordance with a first customization setting of the first system, receive a second customization setting of the second system, and change the data variable from being in accordance with the first customization setting to being in accordance with the second customization setting. The data processing apparatus can receive a current description of the first representation currently associated with the first system and/or the description of the second representation can be received from the second system.

The product can also be operable to cause the data processing apparatus to receive the data variable in a data object including a collection of further variables, receive descriptions of further representations of information in the further variables, the further representations associated with the second system, and change representations of the further variables to the further representations.

The data structure can also be changed to a second data structure associated with the second system. Machine-readable instructions for changing the data variable from the first representation to the second representation can be established.

The systems and techniques described herein can be implemented to realize one or more of the following advantages.

In systems described in this specification, a map of different representations in different systems can be created at the whim of a user, according to the user's needs. This capability limits the need to store large directories of maps, and allows a user to generate the maps on an as-needed basis. For example, if the number of representations that are encountered during operation are limited, the user need only create a limited directory of maps. Also, if a new representation is encountered, e.g., when data from a new system is encountered or a new representation is used in a previously encountered system, then a user can generate a new map.

Maps can be tailored to specific systems and even to specific data structures (such as specific data objects) within the systems. For example, maps can be tailored for data exchange between two specific systems, or maps can be tailored for the exchange of a selected data object between two specific systems. Such specificity of scope in maps reduces the memory overhead for the instructions and speeds processing using the maps. Specificity of scope in maps is particularly relevant where the customization of two different systems can be completely different, completely harmonized, or harmonized in part, since predictions regarding the extent of customization harmonization are difficult to make. Targeted maps of limited scope can significantly reduce processing effort and data overhead in these systems where the extent of customization harmonization is unknown.

Changes to the customization settings of the systems can be accommodated by the mapping process. In particular, the settings themselves can change and yet the mapping process can retrieve the current settings (e.g., from the systems themselves) for use in mapping.

Accommodating changes to customization settings may be important even in a single system landscape that is uniformly customized during installation. In practice, incompatibilities between settings often arise over time even in a single data processing system. For example, the propagation of settings throughout the landscape may not occur every time that a setting is changed. In particular, setting transport requests may be unsent, unreceived, or garbled during transmission. Certain settings may be inadvertently omitted from transport requests, or transport requests may not be prepared. A user may also wish to temporarily test a modified setting on a single system before propagating the setting throughout the landscape, and later forget to propagate or remove the modified setting. Although the likelihood of such events may be small, over time, even well-managed computer system landscapes may include incompatible customization settings. However, the use of current customization settings to generate maps can help accommodate changes to the customization settings by mapping previously unknown, discrepant representations of information.

By separating maps of customization settings from maps of other aspects of information representation, maps of the dynamic customization settings can be generated and updated separately from maps of other, more static aspects of information representation. In particular, maps of customization settings can be generated on an as-needed basis according to user needs. On the other hand, maps of the more static aspects of information representation can be generated and distributed separately. Further, a single map directed to all aspects of information representation could become complex and unwieldy.

Also, separating maps of customization settings from maps of other aspects of information representation allows a user to combinatorially optimize the selection of maps to achieve a desired purpose. For example, a single map of two data structures can be joined with any number of maps of customization settings.

The details of one or more implementations are set forth in the accompanying drawings and the description below. Other features, objects, and advantages will be apparent from the description and drawings, and from the claims.

DESCRIPTION OF DRAWINGS

FIGS. 2 and 3 illustrate the impact of customization settings upon example representations of information in different data processing systems.

FIG. 4 shows an example integration engine.

FIGS. 5 and 6 show example descriptions of customization settings in different systems.

Like reference symbols in the various drawings indicate like elements.

DETAILED DESCRIPTION

Figure 1:
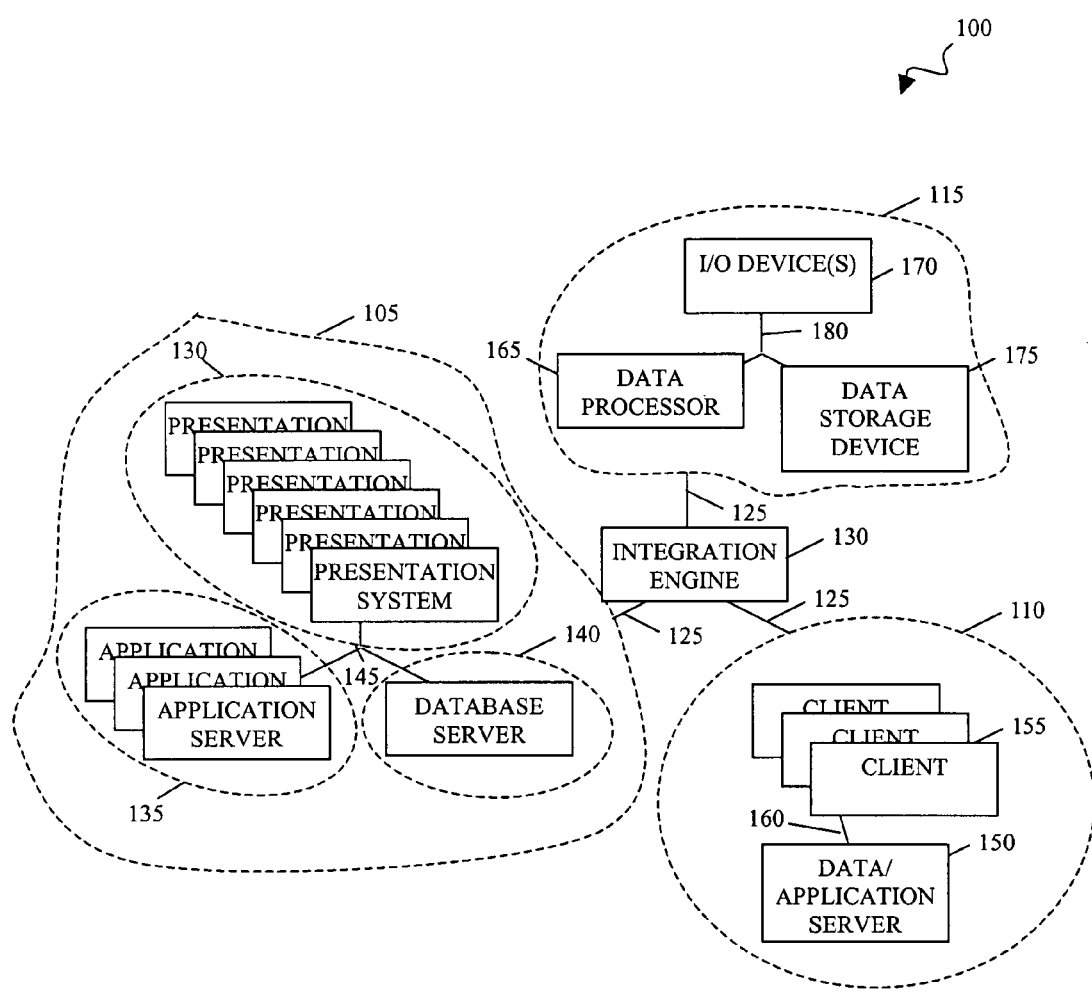
FIG. 1 shows a distributed data processing landscape with different data processing systems.

FIG. 1 shows a distributed data processing landscape 100. Landscape 100 includes data processing systems 105, 110, 115, a data link 125, and an integration engine 130. Data processing systems 105, 110, 115 can operate autonomously, handling local workloads of data processing activities. Data processing systems 105, 110, 115 can also exchange data with each other across data communication link 125. Data are machine-readable representations of information. Data that originates from a source system of systems 105, 110, 115 can be relayed over link 125 to a target system of systems 105, 110, 115. The data can be relayed in accordance with pre-established data communication rules and protocols. Integration engine 130 manages the representation of information communicated in accordance with these rules and protocols so that data from a source system can be processed appropriately by a target system.

Data processing systems 105, 110, 115 can be devices or groups of devices that perform data processing activities in accordance with the logic of a set of machine-readable instructions. As one example of a data processing system, data processing system 105 includes a three tiered hierarchy of data processing devices. The hierarchy includes a presentation layer 130, an application layer 135, and a database layer 140. Data processing system 105 also includes a system data link 145. Presentation layer 130 processes interactions with users, including the display of a graphical user interface. Application layer 135 processes the administrative functions of data processing system 105. The administrative functions can include background processing, printing, and process request management. Database layer 140 processes the storage, organization, retrieval, and presentation of instructions and data for processing activities. Data link 145 allows data regarding processing activities to be exchanged between the devices in layers 120, 135, 140. Data link 145 can be a network such as a LAN, a WAN, or the Internet. Data on data link 145 can be relayed to systems and devices outside data processing system 105 over data communication link 125 using, e.g., a hardware and/or software communications gateway (not shown).

As another example of a data processing system, data processing system 110 includes a data/application server 150, one or more clients 155, and a data link 160. Data/application server 150 stores data and processes services that are provided to clients 155 over data link 160. Clients 155 manage interactions with users. Data on data link 160 can be relayed to systems and devices outside data processing system 110 over data communication link 125 using, e.g., a communications gateway (not shown).

As another example of a data processing system, data processing system 115 includes a data processor 165, a data storage device 170, one or more input/output devices 175, and a data link 180. Data processor 165 can be a processing unit of a data processing device such as a computer, data storage device 170 can be a memory or disk storage device, and input/output devices can be one or more devices for communicating with a user including a monitor, a keyboard, a mouse, or a touchscreen. Data link 180 can be a signal carrier such as a bus or a wire.

Integration engine 130 is hardware and/or software that manages the representation of information in data so that data from a source system can be processed appropriately by a target system. The representation of information can be impacted both by the configuration of data in a system and the customization of data in a system. The configuration of data in a system impacts both the content of data in the system and the structure of data in the system. The content of data is the amount and type of information represented in the data. The structure of data is the organizational scheme of the information represented in the data. The organizational scheme of a data structure can be a group of associated data variables and/or other data structures. Examples of common data structures include files, lists, arrays, records, trees, tables, stacks, and objects. Data can be structured both by language or by the use of selected organizational schemes in a language. A language is a system for communicating. Examples of languages where data can be structured differently include XML and xCBL.

The customization of data tailors the representation of information in data variables to a specific purpose. The customization of data in a system can be selected by a user to meet the specific requirements of a customer. Data can be customized to the context in which the data is to be used or to meet the purpose for which the data is to be used. For example, the format of data variables in a system may be tailored to meet the requirements of a particular country, a particular industry, a particular company, or a particular department or site in a company to accurately fulfill even specialized or localized needs. Examples of data customization include language customization, unit customization (e.g., metric versus English), format customization (e.g., month/day/year versus day/month/year), and notation customization (e.g., representing an employee's gender as male/female versus M/F versus 0/1).

For purposes of illustration, FIGS. 2 and 3 show examples of how the customization of data in a system can impact the representation of data in a system. In particular, FIG. 2 shows an example products table 200. Products table 200 can be one or more objects in a computer system such as an enterprise resource planning system. Products table 200 can describe the former and current products sold by an enterprise, as well as the availability of the products. Products table 200 includes names 205, numbers of available units in stock 210, sizes 215, weights 220, and list prices 225 of products. Sizes 215, weights 220, and prices 225 have been customized by settings 230, 235, and 240. In particular, the sizes 215 are customized to centimeter setting 230, weights 220 are customized to kilogram setting 235, and list prices 225 are customized to Euro setting 240.

FIG. 3 shows an example products table 300. Products table 300 can be an object in a customer relationship management system. Products table 300 describes products previously purchased by a particular customer. Products table 300 includes names 305, numbers of available units previously purchased 310, sizes 315, weights 320, and list prices 325 of products. Sizes 315, weights 320, and prices 325 have been customized by settings 330, 335, and 340. In particular, the sizes 315 are customized to inch setting 330, weights 320 are customized to kilogram setting 235, and list prices 325 are customized to dollar setting 340.

If the customization settings of objects 200, 300 are not identical, then the information in objects 200, 300 may not be directly transferable between data processing systems. For example, a single data processing system may attempt to process both tables 200, 300. Because setting 230 customizes product size 215 to be in inches and setting 330 customizes product size 315 to be in centimeters, the results of such data processing may be incorrect.

Integration engine 130 manages the representation of information, including the customization of data, so that information from a source system can be processed appropriately by a target system. As shown in FIG. 4, integration engine 130 can include an integration server 405 that results from the performance of machine-readable instructions by one or more data processing machines. Integration server 405 can support open and/or closed standards. For example, integration server 405 can support the Java 2 Enterprise Edition (J2EE) standard or the Advanced Business Application Programming (ABAP) language.

Integration server 405 can access customization data 410 and configuration data 415 to map representations of information between different systems. Customization data 410 describes the customization of data in a system, including the customization settings. Configuration data 415 describes the configuration of data in a system, including, e.g., the languages and data structures in the system. Customization data 410 and configuration data 415 can be stored at a central database or can be distributed to one or more databases in the described systems.

FIGS. 5 and 6 show example descriptions 500, 600 of customization in different systems. Description 500 is a table of customization settings in a first system and description 600 is a table of customization settings in a second system. Description 500 includes names of classes of data objects 505 in the first system, as well as settings 510 that customize named data object class 505. Description 600 includes names of classes of data objects 605 in the second system, as well as settings 610 that customize named data object class 605.

Figure 7:
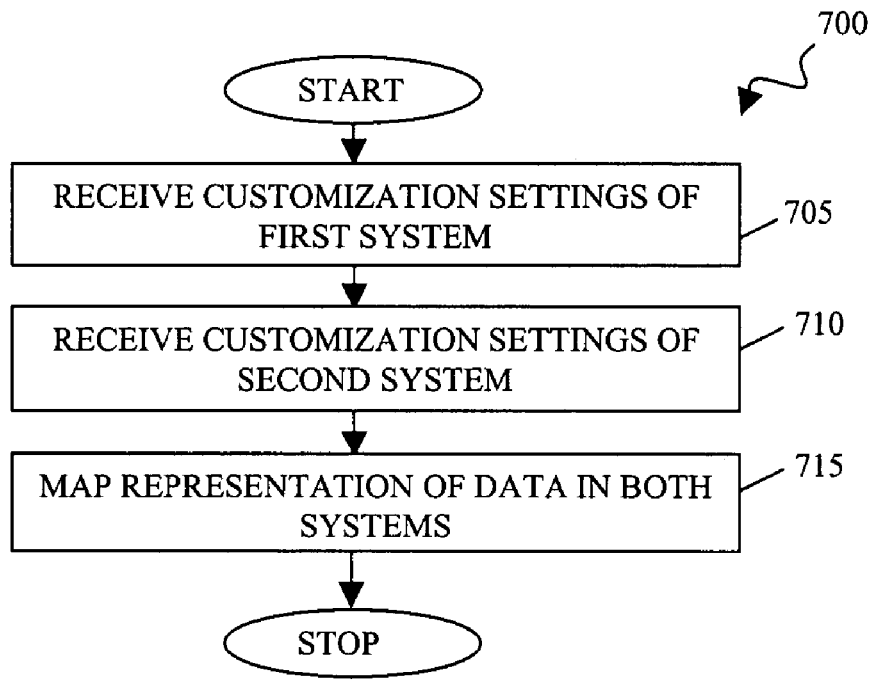
FIG. 7 shows an example of an approach to generating maps of representations of data.

FIG. 7 is a flowchart of a method 700 whereby an integration engine can manage different representations of information by mapping representations of information between different systems. An integration engine performing method 700 receives information describing the customization of a first data processing system (step 705) and the customization of a second data processing system (step 710). The received information can be customization settings describing how classes of data objects in the data processing systems have been tailored to meet user requirements.

The integration engine then maps the representation of information in the first and the second system (step 715). For example, the integration engine can map customization settings of the first and the second system. In mapping, the integration engine can identify and represent the correspondence between the customization settings, and hence the customization of data variable, in the first and second systems. The resulting representation of the correspondence between the customization settings can be machine-readable instructions for changing the representation of a data object in the first system into the representation of the same data object in a second system.

Figure 8:
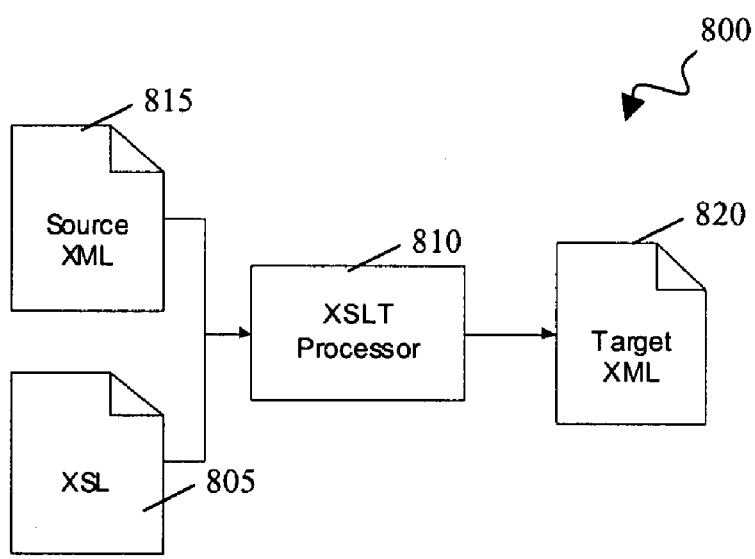
FIG. 8 shows an example of the use of a map to change the representation of data.

FIG. 8 shows a method 800 that uses a map of customization settings 805 to map representations of information. Map of customization settings 805 can be machine-readable instructions for creating a result document with one representation of data from a source document with another representation of data. For example, map of customization settings 805 can provide one or more template rules used in creating a result document. A template rule is a machine-readable definition of criteria for selecting portions of a source data structure and instructions for restructuring the selected portions to create a result data structure. A template rule can include a pattern that is matched against data in a source document and a template that can be instantiated to form part or all of a result document. The source document and the result document can have a tree structure. A template can be instantiated for all or a portion of a source data structure to create all or a portion of a result data structure.

Map of customization settings 805 can be stored as an extensible stylesheet language (XSL) file that describes, to a extensible stylesheet language-transformation (XSLT) processor 810, how to transform a representation of information in a source system to a different representation for use in a target system. XSLT processor 810 can be an application that associates the pattern of source XML document 815 with the pattern included in a template rule in an XSL map of customization settings 805 and instantiates the template in the template rule. The source system can represent information in a source XML document 815 and the target system can use the information in a target XML document 820 with a different representation.

Figure 9:
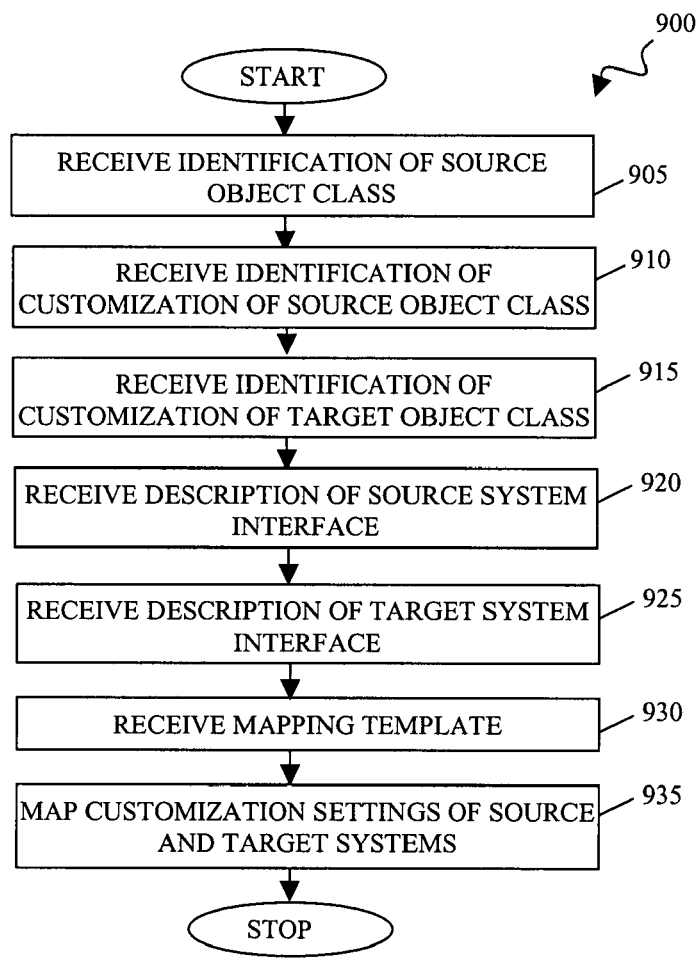
FIG. 9 shows another example of an approach to generating maps of representations of data.

FIG. 9 shows a method 900 for generating instructions for transforming a representation of information in a source system to a different representation used in a target system. The generated instructions can be an XSL file that describes, to an XSLT processor, how to manage different representations of information.

A system performing method 900 receives an identification of a source object class (step 905). The identification can be information that the system can use to identify an object of the object class or instructions for identifying an object of the object class. The instructions can be instructions for identifying an object of the object class in a data structure or the instructions can be instructions for modeling data structures in various ways (e.g., as a tree of nodes) to facilitate identification of an object of the object class. The instructions can be Xpath expressions for identifying an object of the object class in an XML document.

The system performing method 900 also receives an identification of the customization settings of the object class in the source system (step 910) and an identification of the customization settings of the object class in the target system (step 915). The identification of the customization settings can be the customization settings themselves, the location of the customization settings of the source and target system, or instructions for reading the customization settings of the source and target system. For example, the identification of the customization settings can be instructions for reading the customization settings of the source system from the source system and instructions for reading the customization settings of the target system from the target system.

The system performing method 900 also receives a description of the source system database interface (step 920) and a description of the target system database interface (step 925). A system database interface is a technique or collection of rules for writing data into a database or reading data from a database. For example, a database interface can be a technique for the real-time or batch reading or writing of data. As another example, a database interface can be a technique for the synchronous or asynchronous reading or writing of data.

The system performing method 900 also receives a mapping template (step 930). A mapping template provides a framework for instructions for representing the correspondence between customization settings in two different systems. For example, a mapping template can be a framework for machine-readable instructions for transforming information representations between a first representation in a first system and a second representation in a second system. A mapping framework can include fields for descriptions of a source system database interface and a target system database interface. A mapping framework can include a field for instructions for identifying an object of a selected object class in a data structure. A mapping framework can include can include fields for instructions for locating the customization settings of a source and a target system, as well as fields for instructions for representing the correspondence between customization settings.

The framework can also include identifications of potentially relevant instructions for representing the correspondence between customization settings. For example, a mapping template can be an XSL document that includes namespaces that identify Java calls of code for transforming the customization of data in a source system to the customization of data in a target system.

The system performing method 900 also maps the customization settings of the first and the second system (step 935). The system can map the customization settings by inserting specific instructions into one or more fields in the mapping template. For example, the system can insert instructions for importing data into or exporting data (such as customization settings) from the source system and the target system. The system can insert instructions for identifying objects of a selected object class in a data structure (such as objects in an XML document). The system can insert instructions for locating the customization settings of a source and a target system, for example in the source and target systems themselves. The system can insert instructions for representing the correspondence between customization settings. For example, the system can insert information that identifies specific Java calls for transforming objects represented in accordance with a source system's customization settings into objects represented in accordance with a target system's customization settings. The inserted Java calls can be from namespaces included in the XSL document.

Figure 10:
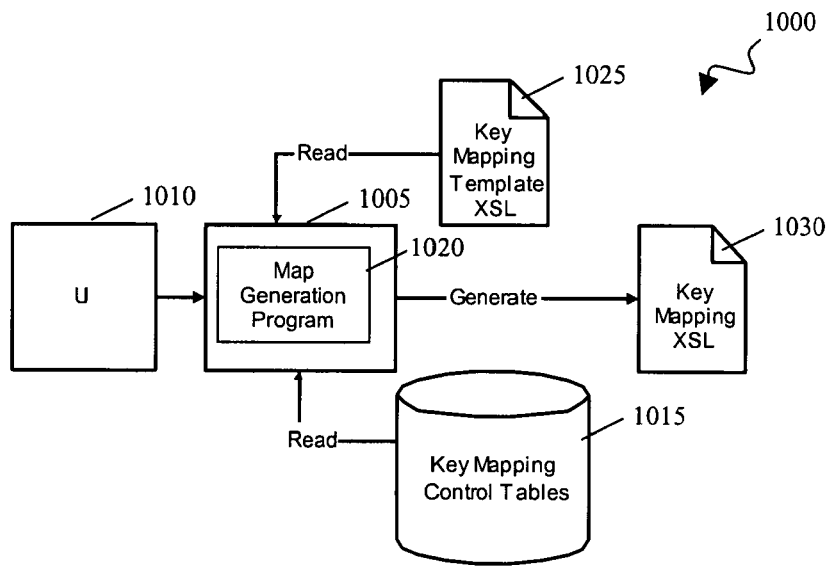
FIG. 10 shows an example of a performance of the approach of FIG. 9 on a data processing system.

FIG. 10 illustrates the performance of one implementation of method 900 in a system 1000 for generating instructions for transforming a representation of data in a source system to a representation of data in a target system. System 1000 can be integration engine 130 (FIG. 1) or system 1000 can be a separate system that provides a map of customization settings to integration engine 130 (FIG. 1).

System 1000 includes a data processor 1005, a user interface 1010, and a key mapping control table database 1015. Key mapping control table database 1015 includes instructions for performing various tasks in mapping representations of data between different systems. Tables 1 and 2 shows example tables that can be included in key mapping control table database 1015.

TABLE 1

| COLUMN NAME | DATA TYPE | DESCRIPTION |
| --- | --- | --- |
| SOBJTYPE | Char | Source Object type |
| TOBJTYPE | Char | Target Object type |
| MAPRELID | Char | Interface combination identifier |
| COUNTER | INT | Counter for the expressions |
| XPATH | Char | XPATH expression |

TABLE 2

| COLUMN NAME | DATA TYPE | DESCRIPTION |
| --- | --- | --- |
| CLIENT | Char | Client number |
| SOBJTYPE | Char | Source object class |

TABLE 2-continued

| COLUMN NAME | DATA TYPE | DESCRIPTION |
|---|---|---|
| TOBJTYPE | Char | Target object class |
| MAPRELID | Char | Interface combination identifier |
| SOURCESYS | Char | Location of source system customization settings |
| TARGETSYS | Char | Location of target system customization settings |
| ACTIVE | Flag | Entry is active |

User interface 1010 can include one or more input/output devices for communicating with a human user. Data processor 1005 can execute machine-readable instructions, including a map generation program 1020 for generating instructions for transforming a representation of data in a source system to a representation of data in a target system.

In operation, map generation program 1020 receives user identification of the class of the source object(s) that are to be represented in a target system over user interface 1010. Map generation program 1020 can also receives an identification of the target system from a user over user interface 1010.

Map generation program 1020 accesses key mapping control table database 1015 to read relevant entries from the tables. For example, map generation program 1020 can read instructions (or information identifying instructions in a separate database) for: reading data from the source and target systems; identifying objects of a selected object class in a data structure; locating the customization settings of a source and a target system; and representing the correspondence between customization settings.

Map generation program 1020 also reads a key mapping template 1025. Key mapping template 1025 can be an XSL document that provides a framework for instructions for representing the correspondence between customization settings in two different systems. Map generation program 1020 can read key mapping template 1025 from another database (as shown) or from key mapping control table database 1015.

Using key mapping template 1025 and the relevant entries from key mapping control table database 1015, map generation program 1020 generates a key mapping XSL 1030. Key mapping XSL 1030 can be used as a map of customization settings to map representations of data. For example, key mapping XSL 1030 can be used by an XSLT processor, such as XSLT processor 810 of FIG. 8, to map representations of data.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

A number of embodiments have been described. Nevertheless, it will be understood that various modifications may be made. For example, aspects of the techniques and systems described herein can be used for mapping the structuring of data as well as the customization of data. Steps in the various approaches can be performed out of turn or omitted and desirable results can still be achieved. Maps of representations need not be stored. Rather, they can be created prior to use and then discarded after use. Instructions for mapping the customization of data can be associated with instructions for mapping the structure of data. Accordingly, other implementations are within the scope of the following claims.

What is claimed is:

1. A computer-implemented method for managing different representations of information, comprising:
   receiving information describing a first representation of data variable information in a first data structure in a first data processing system;
   receiving information describing a second representation of the data variable information in the first data structure in a second data processing system; and
   mapping the first representation of the data variable information to the second representation of the data variable information, the mapping comprising:
      identifying a correspondence between the first representation and the second representation using a set of data processing activities performed in accordance with a first set of machine-readable instructions, representing the correspondence using the set of data processing activities performed in accordance with the first set of machine-readable instructions, and making the correspondence between the first representation and the second representation available for changing the first representation of the data variable information to the second representation of the data variable information.

2. The method of claim 1, wherein:

mapping the first representation to the second representation further comprises establishing a second set of machine readable instructions for changing the first representation of the data variable information to the second representation of the data variable information; and making the correspondence available comprises making the second set of machine readable instructions available.

3. The method of claim 2, wherein establishing the second set of machine-readable instructions comprises establishing a criterion for identifying a data variable in a first data structure.

4. The method of claim 2, wherein establishing the second set of machine-readable instructions comprises establishing an extensible stylesheet language (XSL) file that describes how to change the first representation of the data variable information.

5. The method of claim 2, wherein establishing the second set of machine-readable instructions comprises:

receiving a framework for instructions; and inserting instructions into the framework.

6. The method of claim 2, wherein establishing the second set of machine-readable instructions comprises selecting a germane instruction for transforming the first representation to the second representation from a collection of instructions for transforming the first representation to the second representation.

7. The method of claim 2, wherein the second set of machine-readable instructions comprises instructions for identifying the data variable in a data structure.

8. The method of claim 7, wherein the instructions for identifying the data variable comprise an Xpath expression for identifying an object of an object class that includes the data variable.

9. The method of claim 1, further comprising changing the first representation of the data variable information in the data variable in the first data processing system to the second representation of the data variable information in the second data processing system using the correspondence between the first representation and the second representation.

10. The method of claim 1, further comprising receiving a trigger for the mapping, the trigger identifying a data object class that includes the data variable.

11. The method of claim 1, further comprising storing results of the mapping in a collection of mapping results.

12. The method of claim 1, wherein the information describing the first representation of data variable information comprises instructions for locating the information in the first data processing system.

13. The method of claim 1, wherein the information describing the first representation of data variable information comprises the first representation of data variable information.

14. The method of claim 1, further comprising:

receiving instructions for data interfacing with the first data processing system; and adding the interfacing instructions to results of the mapping.

15. The method of claim 1, wherein the first representation specifies a language of the information in the data variable.

16. The method of claim 1, wherein the first representation specifies a unit of the information in the data variable.

17. The method of claim 1, wherein the first representation specifies a notation of the information in the data variable.

18. The method of claim 1, wherein the first representation specifies a formal of the information in the data variable.

19. A computer program product, tangibly embodied in one or more machine-readable storage devices, for managing different representations of information, the computer program product being operable to cause one or more data processing apparatus to:

receive a data variable in a data structure, wherein data variable information in the data variable has a first representation associated with a first system;

receive a description of a second representation of the data variable information, wherein the second representation is associated with a second system;

identify and represent a correspondence between the first representation and the second representation to generate a set of mapping information; and change the data variable information from the first representation to the second representation in accordance with the set of mapping information and separately from any change to the structure of the data structure; and make the data variable information having the second representation available in the data structure.

20. The computer program product of claim 19, wherein the product is also operable to cause the data processing apparatus to:

receive the data variable information formatted in accordance with a first customization setting of the first system;

receive a second customization setting of the second system, wherein the first customization setting and the second customization setting specify at least one of a language, a format, and a unit of the data variable information; and change the data variable information from being in accordance with the first customization setting to being in accordance with the second customization setting.

21. The computer program product of claim 19, wherein the product is also operable to cause the data processing apparatus to receive a current description of the first representation.

22. The computer program product of claim 19, wherein the product is also operable to cause the data processing apparatus to receive the description of the second representation from the second system.

23. The computer program product of claim 19, wherein the product is also operable to cause the data processing apparatus to:

receive the data variable in a data object including a collection of further variables;

receive descriptions of further representations of information in the further variables, the further representations associated with the second system; and change representations of data variable information in the further variables to the further representations.

24. The computer program product of claim 19, wherein the product is also operable to cause the data processing apparatus to change the data structure to a second data structure associated with the second system.

25. The computer program product of claim 19, wherein the product is also operable to cause the data processing apparatus to establish machine-readable instructions for changing the data variable information from the first representation to the second representation; and make the machine readable instructions available.

26. The computer program product of claim 19, wherein the first representation specifies a language of the information in the data variable.

27. The computer program product of claim 19, wherein the first representation specifies a unit of the information in the data variable.

28. The computer program product of claim 19, wherein the first representation specifies a notation of the information in the data variable.

29. The computer program product of claim 19, wherein the first representation specifies a format of the information in the data variable.

30. The method of claim 1, wherein making the correspondence between the first representation and the second representation available comprises providing the correspondence in a directory of mapping information.

* * * * *